(12) United States Patent
Schafer et al.

(10) Patent No.: US 10,333,974 B2
(45) Date of Patent: Jun. 25, 2019

(54) AUTOMATED PROCESSING OF SUSPICIOUS EMAILS SUBMITTED FOR REVIEW

(71) Applicant: Bank of America Corporation, Charlotte, NC (US)

(72) Inventors: Christopher P. Schafer, Simi Valley, CA (US); Eric R. Camarata, Charlotte, NC (US); Michael Thomas Malarkey, Waxhaw, NC (US); Elizabeth R. Liuzzo, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 42 days.

(21) Appl. No.: 15/667,775

(22) Filed: Aug. 3, 2017

(65) Prior Publication Data

US 2019/0044975 A1 Feb. 7, 2019

(51) Int. Cl.
*G08B 23/00* (2006.01)
*H04L 29/06* (2006.01)
(Continued)

(52) U.S. Cl.
CPC ....... *H04L 63/1483* (2013.01); *G06Q 10/107* (2013.01); *H04L 61/307* (2013.01); *H04L 63/1408* (2013.01)

(58) Field of Classification Search
CPC .. H04L 63/1483; H04L 63/308; H04L 63/145
(Continued)

(56) References Cited

U.S. PATENT DOCUMENTS 7,203,838 B1 4/2007 Glazer et al.
7,657,935 B2 2/2010 Stolfo et al.
(Continued)

OTHER PUBLICATIONS

Nampoothiri et al, Email Forensic Analysis on K-Means Clustering, 2015, IEEE, pp. 814-817.*
(Continued)

*Primary Examiner* — Luu T Pham
*Assistant Examiner* — Jenise E Jackson
(74) *Attorney, Agent, or Firm* — Weiss & Arons LLP; Michael A. Springs, Esq.

(57) ABSTRACT

Systems and methods for enterprise cybersecurity triaging of emails suspected of malicious content. Triaging may include analyzing threat level of email submitted for cybersecurity review. The systems and methods may deconstruct an email into components scorable for threat type and/or threat level. The systems and methods may include multiple dynamically selectable threat scoring modules. Email threat level may be based on component scores. Evaluated emails and scored components may be stored. Cybersecurity threat analysis may include comparison of the email and/or the scorable components against previously stored evaluated emails and previously stored scored components. Triaging may include identifying enterprise response teams experienced in the threat type and/or threat level of the email and/or of its components. Triaging may include preventing infiltration of an enterprise by malicious emails. The systems and methods may include feedback to enterprise associates regarding detecting and handling potentially malicious emails.

18 Claims, 7 Drawing Sheets

(51) Int. Cl.
  *G06Q 10/10* (2012.01)
  *H04L 29/12* (2006.01)
(58) Field of Classification Search
  USPC .......................................................... 726/22
  See application file for complete search history.

(56) References Cited

U.S. PATENT DOCUMENTS

| | | | | |
|---|---|---|---|---|
| 2003/0041126 | A1* | 2/2003 | Buford | G06Q 10/107 709/220 |
| 2003/0225841 | A1* | 12/2003 | Song | H04L 51/12 709/206 |
| 2005/0071432 | A1* | 3/2005 | Royston, III | G06F 21/55 709/206 |
| 2005/0257261 | A1* | 11/2005 | Shraim | G06Q 10/107 726/22 |
| 2006/0168041 | A1* | 7/2006 | Mishra | H04L 29/1215 709/206 |
| 2006/0168066 | A1* | 7/2006 | Helsper | G06Q 10/107 709/206 |
| 2009/0070872 | A1* | 3/2009 | Cowings | G06Q 10/107 726/23 |
| 2010/0153381 | A1* | 6/2010 | Harris | G06Q 10/107 707/723 |
| 2010/0192224 | A1* | 7/2010 | Ferri | G06F 21/53 726/23 |
| 2015/0058428 | A1* | 2/2015 | Caskey | H04L 51/02 709/206 |
| 2015/0067833 | A1 | 3/2015 | Verma et al. | |
| 2015/0156183 | A1* | 6/2015 | Beyer | H04L 63/08 726/4 |
| 2015/0237061 | A1* | 8/2015 | Shraim | H04L 63/1425 726/22 |
| 2016/0191548 | A1* | 6/2016 | Smith | H04L 63/1416 726/23 |
| 2017/0243000 | A1* | 8/2017 | Shraim | G06F 21/53 |
| 2018/0227324 | A1* | 8/2018 | Chambers | H04L 63/1441 |

OTHER PUBLICATIONS

Fong, Mining Suspicious Patterns in Physical Environment, 2007, IEEE, pp. 419-422.*

Bhattacharyya et al, MET: An Experimental System for Malicious Email Tracking, Sep. 26, 2002, ACM, pp. 3-10.*

"About Virus Total," https://www.virustotal.com/en/about, Retrieved on May 28, 2017.

"Blue Coat Systems," https://en.wikipedia.org/wiki/Blue_Coat_Systems, Wikimedia Foundation, Inc., May 18, 2017.

"Symantec Email Security. Cloud," https://www.symantec.com/en/au/products/email-security-cloud, Retrieved on Jul. 2, 2017.

"Fire Eye," https://en.wikipedia.org/wiki/FireEye, Wikimedia Foundation, Inc., May 8, 2017.

"URL", https://en.wikipedia.org/wiki/URL, Wikimedia Foundation, Inc., Apr. 28, 2017.

"FireEye: More Data, Faster Fixes," www.fireeye.com, Available as of Jul. 29, 2017.

"Internet Security Threat Report—vol. 21," Symantec Corporation, Apr. 2016.

"Blue Coat: Support and Services," https://www.bluecoat.com/en~gb/support-services, Retrieved on Jul. 12, 2017.

"Vendor Solutions," https://www.vendorsolutions.org/, Retrieved on Jul. 12, 2017.

"PhishMe,", https://phishme.com/, Retrieved on Jul. 12, 2017.

* cited by examiner

| Escalate | Review Case | | Tool Inbox | | | | | |
|---|---|---|---|---|---|---|---|---|
| Time Received | Subject | Abuse Reporter | Original Sender | Is_Evil | Escalated | cert_is_evil | locked by | fre.. |
| 1/1/2018 13:03 | FW Royal Inheritance Yours for Claiming | "Al B." <alb@bus.org> | majesty@empire.gov | Malicious (EM Escalation) | false | Not Reviewed | Null | 5 |
| 1/2/2018 19:00 | FW IMPORTANT! Please don't Ignore!! | "Jan K." <jank@bus.org> | ignore@ee.com | Malicious (EM Escalation) | false | Under Review | Team2 | 2 |
| 1/3/2018 14:50 | FW Invest in Your Life!!!!!!!! | "Jill Q." <jillq@bus.org> | invest@life.org | Malicious (EM Escalation) | true | Reviewed | Null | 5 |
| 1/4/2018 15:09 | FW Royal Inheritance Yours for Claiming | "Tim O." <timo@bus.org> | majesty@empire.gov | Malicious (EM Escalation) | false | Not Reviewed | Null | 2 |
| 1/5/2018 9:50 | FW Royal Inheritance Yours for Claiming | "Al B." <alb@bus.org> | majesty@empire.gov | Malicious (EM Escalation) | false | Not Reviewed | Null | 1 |

| Overview | Email Body | URLs | Files |
|---|---|---|---|

Subject: FW Royal Inheritance Yours for Claiming
Original Submitter: "Tim O." <timo@bus.org>
Source Email: majesty@empire.gov
Cert Review : 0
Number of URLs: 5
Number of Attachments: 0

FIG. 3

AUTOMATED PROCESSING OF SUSPICIOUS EMAILS SUBMITTED FOR REVIEW

FIELD OF TECHNOLOGY

This disclosure relates to improving the security of software and hardware deployed in complex enterprise environments of interconnected computer systems.

BACKGROUND

Malware such as viruses, worms, trojans, ransomware, spyware, adware and other malicious software is becoming an increasingly costly part of doing business using computer networks. Cybercrime damage is predicted to grow from three trillion dollars in costs in 2015 to six trillion dollars annually by 2021 (see, e.g., CSO Security Business Report, Jun. 15, 2017). Panda Labs™ reported capturing eighteen million new malware samples in the third quarter of 2016 alone, for an average of 200,000 new malware samples a day. According to a report from the Federal Bureau of Investigation (June 2016), about 4,000 ransomware attacks occurred per day in 2016. Kaspersky™ reported a rise in ransomware attacks between January of 2016 to September 2016 from once every two minutes to once every 40 seconds. Phishing emails including ransomware grew by over 97% during the third quarter of 2016 (PhishMe™ 2016 Q3 Malware Review). As such, the importance of associates of an enterprise understanding the threat of malicious emails is ever increasing. Nonetheless, even users who claim to know the risks of unknown links in emails, click on the links in the emails they receive (Z. Benenson, Friedrich-Alexander University).

It would be desirable, therefore, to provide apparatus and methods for preventing infiltration of an enterprise by malicious emails. It would also be desirable to provide apparatus and methods for efficiently determining which emails submitted for review pose a threat and which are benign. It would further be desirable to provide apparatus and methods for instructing enterprise associates regarding detecting and appropriately responding to potentially malicious emails.

BRIEF DESCRIPTION OF THE DRAWINGS

The objects and advantages of the present invention will be apparent upon consideration of the following detailed description, taken in conjunction with the accompanying drawings, in which:

FIG. 3 shows an illustrative screen display in accordance with the principles of the invention;

DETAILED DESCRIPTION OF THE INVENTION

Figure 1:
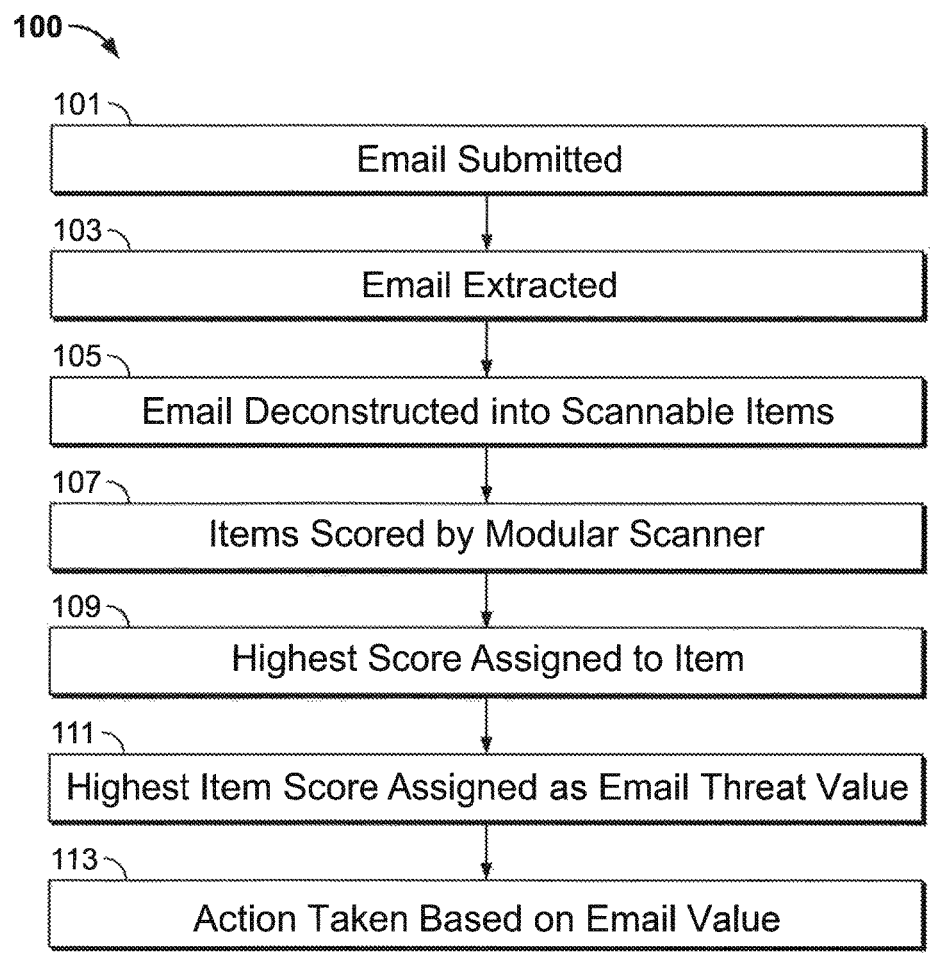
FIG. 1 is a flow diagram of an illustrative process in accordance with the principles of the invention.

The apparatus may include, and the methods may involve, an enterprise level software tool for cybersecurity triaging of one or more than one suspicious email. The email may be suspicious due to email properties indicating a possible association with a phishing attack. The email may be suspicious due to email properties indicating a possible association with a malware attack. The email(s) may have been sent to any suitable email recipient(s). Receipt by the recipient of the email may be termed an incident. The tool may be configured to respond to one or more than one incident.

The email recipient(s) may include an enterprise. The email recipient(s) may include an enterprise associate. The email recipient(s) may include an enterprise client. The email recipient may submit the email for cybersecurity triaging.

Submission of the incident for cybersecurity triaging may include a forwarding of the email. The submission may include submitting a reference to the email. The submission may include submitting a reference to the incident.

A submitter of the email may include the recipient of the email. The submitter may be internal to the enterprise. The submitter may include the enterprise associate. The submitter may be external to the enterprise. The submitter may include a client of the enterprise. The submitter may include any submitter of the email for review.

The submission may be submitted to a cybersecurity inbox. The submission may be submitted to the tool. The submission may be submitted to a tool inbox. The tool may be configured to extract the email from a mailbox of the recipient.

The submitter may submit the email to a tool incident-handling queue. The submitter may submit a reference to the email to the queue. The submitter may submit the incident to the queue.

The queue may include the incident. The queue may include a plurality of the incidents. The queue may include the email. The queue may include a plurality of the emails. The queue may include the reference to the email. The queue may include a plurality of references to the plurality of the emails.

The tool may include a non-transitory machine readable memory. The non-transitory memory may store computer executable instructions. The tool may include a processor configured to execute the instructions. For example, a processor circuit may be embedded in an integrated circuit board of the tool. The processor may control overall operation of the tool.

The apparatus may include, and the methods may involve, converting the email into a case for review. The review may be performed by one or more than one cybersecurity reviewer. The review may be performed by one or more than one cybersecurity team. The cybersecurity team(s) may include enterprise team(s). The cybersecurity team(s) may include cybersecurity group(s). The cybersecurity team(s) may be internal to the enterprise. The cybersecurity team(s) may include one or more enterprise employees. The cybersecurity team(s) may be external to the enterprise. The cybersecurity team(s) may include outside cybersecurity analyst(s). The cybersecurity team(s) may include one or more of the reviewer(s). The reviewer(s) may include the enterprise employee(s). The reviewer(s) may include the outside analysts(s).

The apparatus may include, and the methods may involve, integration of the tool within a structuring of the enterprise. The structuring may include and/or involve one or more of the cybersecurity team(s). The structuring may be hierarchical. The apparatus may include, and the methods may involve, escalation to one or more of the cybersecurity team(s) as a function of a threat type assessed during the review and/or of a threat level assessed during the review.

The threat type may include spam. The threat type may include one or more than one denial-of-service attack. The threat type may include phishing. The threat type may include malware. The threat type may include ransomware. The threat type may include one or more than one virus. The threat type may include one or more than one trojan. The threat type may include one or more than one worm. The threat type may include any form of malicious email(s).

The threat level may include and/or involve the threat type. The threat level may include and/or involve a severity of the threat. The threat level may be determined relative to functioning of the enterprise. The threat level may be determined based on a type and/or severity of risk to the functioning of the enterprise. The threat level may be determined based on a potential cost to the enterprise. The cost may include a loss of time. The cost may include a financial burden. A potential attempted trojan infiltration may be evaluated as a higher level threat than a potential attempted phishing attack. The threat level may be assessed within the threat type. A potential attempted trojan infiltration of one trojan type may be evaluated as a higher level threat than a potential attempted trojan infiltration of a second trojan type. The threat level may be evaluated numerically.

The tool may include a receiver configured to receive the suspicious email. The receiver may include the cybersecurity inbox. The receiver may include the tool inbox. The receiver may include the queue. The tool may include a filter, such as a spam filter. The email may be captured by the filter without the submission of the email. The filter may perform the submission. The filter may send the email to the receiver. The receiver may receive the email from the filter.

The receiver may be configured to receive an initial identification of the threat type and/or of the threat level of the submitted email. The identification may be submitted by the submitter. The identification may be established by the filter. The identification may be used to drive one or more than one iteration of threat analysis of the submitted email. The identification may be used to drive an initial iteration of threat analysis of the submitted email. The initial iteration may be used to drive a subsequent iteration.

The computer executable instructions, when executed by the processor, may implement one or more than one deconstructing of the email into one or more components. The computer executable instructions, when executed by the processor, may implement one or more than one deconstruction of the email into the component(s). The component(s) may be scoreable for cybersecurity threat type and/or threat level. The component(s) may each be scoreable for cybersecurity threat type and/or threat level.

The component(s) may include one or more than one uniform resource locator (URL) associated with the email. The URL(s) may be included in the email. The component(s) may include only the URL(s). The component(s) may include one or more than one portion of the URL(s). The component(s) may include protocol identifier(s) associated with the email. The component(s) may include protocol(s) associated with the email. The component(s) may include resource name(s) associated with the email. The component(s) may include domain name(s) associated with the email. The component(s) may include scheme(s) associated with the email. The component(s) may include host(s) associated with the email. The component(s) may include path(s) associated with the email. The component(s) may include query string(s) associated with the email. The component(s) may include one or more than one IP address associated with the email. The component(s) may include address(es) linked to in the email. The URL(s) may include the IP address(es).

The component(s) may indicate a sender. The component(s) may include a sender identifier. The component(s) may include a sending address. The component(s) may include an originating address of the email. The component(s) may include a country of origin of the email.

The component(s) may include one or more than one addressee. The component(s) may include one or more than one addressee list. The component(s) may include one or more than one receiving address.

The component(s) may include one or more than one submitter identifier. The component(s) may include one or more than one enterprise associate identifier.

The component(s) may include an email subject line. The component(s) may include one or more than one portion of the email subject line.

The component(s) may include a body of the email. The component(s) may include one or more than one portion of the body of the email.

The component(s) may include one or more than one email attachment. The component(s) may include one or more than one attachment name.

When the sender identifier indicates an enterprise client as sender, enterprise information regarding the client may be associated with the email. The computer executable instructions, when executed by the processor, may produce an association of the email with enterprise client information. The enterprise client information may include client contact information. The enterprise client information may include some or all particulars of client enterprise history.

The computer executable instructions, when executed by the processor, may implement one or more than one analysis. The analysis may analyze the email(s). The analysis may analyze the component(s). The analysis may analyze the component(s) for cybersecurity threat level. The analysis may analyze one or more than one of the component(s).

The tool may include one or more than one modular email analyzer. The modular analyzer(s) may include modular scanner(s). The modular analyzer(s) may include security threat analysis module(s). The modular scanner(s) may include the security threat analysis module(s). The analyzer(s) may perform the analysis. The scanner(s) may perform the analysis. The module(s) may perform the analysis.

The tool may be configured to modify and/or adjust one or more than one of the security threat analysis module(s). The tool may be configured to facilitate user(s) modifying and/or adjusting one or more than one of the security threat analysis module(s). The tool may be configured to add and/or remove one or more than one of the security threat analysis module(s). The tool may be configured to facilitate user(s) adding and/or removing one or more than one of the security threat analysis module(s). The initial identification of threat type and/or threat level may be involved in determining the modification, adjustment, adding and/or removing of the module(s) for the analysis.

The analysis may involve application of one or more of the security threat analysis module(s). The module(s) may involve and/or include proprietary code of the enterprise. The module(s) may involve and/or include software produced by one or more external entities, such as BLUE COAT SYSTEMS™ Inc. (Sunnyvale, Calif.), VirusTotal™ (Dublin, Ireland), PhishMe™ Inc. (Leesburg, Va.) and FireEye™ Inc. (Milpitas, Calif.).

The analysis may involve one or more than one comparison against item(s) stored in one or more than one library of previously scored email deconstructions. The item(s) may include scorable component(s) of previously scored email(s). The library may include an electronic repository for data storage. The library may be used for data retrieval. The library may include a database. The database may be internal to the enterprise. The library may include a phishing database. The library may include a malware database.

The comparison may include a check of whether the presently submitted email(s) was previously stored in the library. The comparison may include a check of whether the component(s) of the presently submitted email(s) was previously stored in the library. The comparison may include a check of whether the URL(s) was previously stored in the library.

The comparison may include checking stored score(s) assigned to previously scored component(s) that have been determined to be similar to and/or the same as the currently submitted component(s). The comparison may include checking stored value(s) assigned to previous email(s) associated with component(s) determined to be similar to and/or the same as the component(s) of the currently submitted email(s). The comparison may include checking stored value(s) assigned to previous email(s) associated with URL(s) determined to be similar to and/or the same as the URL(S) of the currently submitted email(s). The comparison may include checking stored value(s) assigned to previous email(s) originating from an address determined to be similar to and/or the same as the originating address of the currently submitted email(s).

The stored scores(s) may include evaluation(s) of cybersecurity threat level of the previous email(s). The stored value(s) may include final evaluation(s) of cybersecurity threat level of the previous email(s). The stored value(s) may include indication(s) of resolution(s) of the incident(s) associated with the previous emails. The stored value(s) may include final evaluation(s) of cybersecurity threat level of the previous email(s) associated with the same component(s). The stored value(s) may include final evaluation(s) of cybersecurity threat level of the previous email(s) associated with the same URL(s). The stored value(s) may include final evaluation(s) of cybersecurity threat level of the previous email(s) originating from the same address.

The computer executable instructions, when executed by the processor, may implement one or more than one scoring of the component(s) of the presently submitted email(s) by assigning to the component(s) one or more component score(s). The computer executable instructions, when executed by the processor, may implement one or more than one scoring of each of the components. The scoring may include assessing the type of threat. The scoring may include assessing the level of the threat. The scoring may include assessing a probability of the threat. The scoring may include assessing a severity of the threat. The scoring may include assessing a risk of the threat. The scoring may include assessing an identity of the threat. The component score(s) may reflect one or more than one severity of threat level. The component score(s) may be associated with the component(s).

The computer executable instructions, when executed by the processor, may implement one or more than one assignment to the email of threat value associated with the component score. The threat value(s) may reflect one or more than one severity of threat level. The threat value(s) may reflect a most severe of the component scores. The assignment(s) of the threat value(s) to the email may be of the most severe of scores of the component(s). The threat value(s) assigned to the email may include the most severe of scores of the component(s). The threat value(s) may include any suitable rating(s). Any suitable rating(s) may include a weighted average of some or all of the component score(s). Weighting factors of the weighted average may be based on enterprise experience with forms of malicious emails. Weighting factors of the weighted average may be based on non-enterprise experience with forms of malicious emails.

The tool may be customizable by the user(s). The module(s) may be customizable by the user(s). The tool may accommodate writing or modifying of the module(s). The tool may accommodate customization of the module(s). The tool may be customizable by the user(s) without rewriting a main code of the tool. The main code may include the instructions. The module(s) may be customizable by the user(s) without rewriting the main code. The tool may accommodate writing or modifying of the module(s) without rewriting the main code. The tool may accommodate customization of the module(s) without rewriting the main code.

The tool may facilitate selecting one or more than one module from a set of the modules. The set may include one or more of the modules configured to scan one or more of the components. The set may include one or more of the modules configured to scan one or more of the addresses. The set may include one or more of the modules configured to scan one or more of the URLs. The set may include one or more of the modules configured to scan one or more of the attachments. The tool may be configured to facilitate selecting which module(s) of the set to prioritize.

The tool may be configured to facilitate selecting a hierarchy for use of the module(s). The tool may be configured to facilitate selecting a hierarchy for use of the score(s) produced by the module(s). The use of the score(s) may include the assignment of the threat value(s) to the email.

One or more of the security threat analysis modules may be adjustable by the tool. A type and/or number of the modules may be adjustable by the tool. A depth of analysis of the modules may be adjustable by the tool. For example, the tool may apply five out of seven of the modules to score one of the components of the email. Each of the five of the modules may be set for a modular analysis of a particular depth.

The computer executable instructions, when executed by the processor, may implement one or more than one storing of information in the library. The information may be associated with the email. The information may include data associated with one or more results of the analysis. The email may be stored in the library. One or more than one representation of the email may be stored in the library. The threat value(s) may be stored in the library. Representation(s) of the threat value(s) may be stored in the library. The email may be stored in the library in association with the threat value(s). The representation(s) of the email may be stored in the library in association with the threat value(s) and/or with the representation(s) of the threat value(s).

The component(s) may be stored in the library. One or more than one representation of the component(s) may be stored in the library. The component score(s) may be stored in the library. One or more than one representation of the component score(s) may be stored in the library. The component(s) may be stored in the library in association with corresponding component score(s). The representation(s) of the component(s) may be stored in the library in association with representation(s) of the corresponding component score(s).

The tool may be configured to facilitate adding to the library without rewriting the main code of the tool. The tool may be configured to facilitate updating stored data without rewriting the main code.

The instructions, when executed by the processor, may implement selection(s), on the basis of the component score(s), of one or more than one action. The instructions, when executed by the processor, may implement the selection(s), on the basis of the value(s) assigned to the email.

The tool may be configured such that the action(s) is automatically initiated. The tool may be configured to automatically initiate the action(s), without requiring user initiation. The tool may be configured such that the action(s) require initiation by a user(s). The tool may be configured to allow and/or require that the action(s) be selected by one or more than one user.

The action(s) may include responding to the submitter. The action(s) may include removing the email from the mailbox. The action(s) may include removing the email from the mailbox of the submitter. The action(s) may include removing the email from the queue. The action(s) may include moving the email within the queue. The action(s) may include prioritizing the email for the analysis. The action(s) may include reprioritizing the email for the analysis. The action(s) may include adjusting prioritization of the email. The action(s) may include moving the email to a different folder.

The action(s) may include submitting the component(s) for further evaluation(s). The action(s) may include selecting one or more than one degree of further enterprise analysis of and/or activity pertaining to the email. A selected degree of further analysis and/or activity may include escalating the incident to an event management team. The selected degree of further analysis and/or activity may include escalating the incident to a critical event response team.

The tool may include a transmitter configured to perform a transmitting. The transmitting may include sending the email. The transmitting may include sending a representation of the email. The transmitting may include sending the assigned value of the email. The transmitting may include sending one or more of the component(s) and/or the representation(s) of the component(s). The transmitting may include sending the component score(s). The transmitting may include sending the component score(s) and/or the representation(s) of the component score(s).

The transmitting may include sending one or more than one measure of the selected degree of further enterprise analysis. Aspects of the transmitting may conditionally depend on the selected degree of further enterprise analysis. The transmitting may include sending the email and/or the representation(s) of the email, in association with the assigned value of the email. The transmitter may be configured to transmit the component(s) in association with the component score(s). The transmitter may be configured to transmit the component(s) in association with the corresponding component score(s). The transmitter may be configured to transmit each of the components in association with each of the component scores.

The transmitter may transmit to one or more than one appropriate site. The appropriate site may be determined on the basis of the selected degree of further enterprise analysis. The appropriate site(s) may include an appropriate entity. The appropriate site may include a quarantined environment for safely opening the submitted email. The quarantined environment may provide for safely opening one or more attachments associated with the submitted email. The quarantined environment may provide for safely following one or more hyperlinks associated with the submitted email.

The appropriate entity may include the submitter. The appropriate entity may include the enterprise associate. The associate may receive a report transmitted by the transmitter. The report may include feedback for the associate regarding the email. The report may instruct the associate regarding detecting potentially malicious emails. The report may instruct the associate regarding responding to potentially malicious emails. The report may be informed by the analyses and/or activity associated with the submitted email.

The appropriate entity may include one or more than one enterprise-internal threat analysis group. The entity may include one or more than one enterprise threat analysis group that had analyzed a library-stored email that the comparison may match to the currently submitted email. The entity may include the enterprise threat analysis group(s) that had analyzed a previous email associated with library-stored component(s) that the comparison may match to the component(s) of the currently submitted email. The entity may include the enterprise threat analysis group(s) that had analyzed a previous email associated with library-stored URL(s) that the comparison may match to one or more of the URL(s) of the currently submitted email. The transmitter may be configured to send the currently submitted email (and/or its representation(s); and/or its assigned value; and/or its component(s), their representation(s) and/or score(s)) to the enterprise threat analysis group that had analyzed a previous email associated with library-stored component(s) that the comparison may match to the component(s) of the currently submitted email.

The enterprise threat analysis group may be selected on a basis of having analyzed previous email(s) associated with one or more than one of the component(s) of the currently submitted email. The threat analysis group(s) may be selected on a basis of having analyzed previous email(s) associated with the URL(s) associated with the currently submitted email. The threat analysis group(s) may be selected on a basis of having analyzed previous email(s) associated with the address(es) from which the currently submitted email originated.

The tool may be configured to make use of machine learning. One or more of the modules may be configured to make use of the machine learning. Machine learning feedback may be provided by alternative analysis. The alternative analysis may include performance of an alternate algorithm. The alternative analysis may include study of the email and/or its component(s) by the reviewer(s). A set of initial component score(s) of the email may be used to calibrate a set of subsequent component score(s) of the email. Component score(s) of previous email(s) may be used to calibrate the component score(s) of the currently submitted email. Component score(s) of other email(s) may be calibrated using the component score(s) of the currently submitted email.

The machine learning may include supervised learning processes. The machine learning may include unsupervised learning processes. The machine learning may include reinforcement learning processes. The machine learning may include decision tree learning processes. The machine learning may include association rule learning processes. The machine learning may involve artificial neural networks. The machine learning may involve support vector machines. The machine learning may involve clustering. The machine learning may involve Bayesian network(s). The machine learning may include representation learning processes. The machine learning may include similarity and/or metric learning processes. The machine learning may include rule-based machine learning processes. The machine learning may involve learning classifier systems.

The analysis may involve detection of one or more than one pattern suggestive of a threat. The pattern(s) may involve one or more than one characteristic of the component(s). The module(s) may perform the detection of the pattern(s). The detection may involve searching text of the email. A pattern suggestive of a threat of a first type and/or first severity may escalate the case to a first response team. A pattern suggestive of a threat of a second type and/or second severity may escalate the case to a second response team. A pattern indicating a possible phishing attack may escalate the case to a critical event response team.

The tool may be configured to not block the email from the recipient. The tool may be configured to prevent the email recipient from accessing potentially malicious URLs. Potentially malicious URL(s) may be blocked. Identification of potentially malicious URLs may be determined by the module(s).

The tool may include a user interface (UI). The UI may be configured to facilitate triaging the email. One or more of the email(s) evaluated as malicious may be presented within the UI for rapid analysis and/or rapid response to an email campaign. The email campaign may include and/or involve the email.

Email data, such as information relevant to the component(s), may be presented to the user(s) via the UI. The data may include component(s) information. The component(s) information may include statistic(s) regarding the component(s). The component(s) information may include results of past analyses of the component(s). The UI may be configured to present the user(s) with one or more results of one or more past analyses of stored component(s).

The data may be presented as one or more than one table. The data may be presented as one or more than one graph. The data may be presented as one or more than one chart. The data may be presented in any suitable format for presenting the data. Any suitable format may include a list.

The UI may be configured to present the user with one or more than one feature. The feature(s) may include one or more than one virtual button and/or any other suitable feature(s). Suitable feature(s) may include toggle(s), switch(es), dial(s), radio button(s), folder tab(s) and/or check box(es). Activating the feature(s) may initiate the task(s).

The feature(s) may facilitate the user(s) performing one or more than one task. The task(s) may include the action(s). The task(s) may include the user(s) viewing one or more portions of the data. The task(s) may include viewing one or more details of the case in one or more than one level of comprehensiveness. The details may include the component(s) data.

The task(s) may include allowing the reviewer of the incident to indicate acceptance of the incident as the case for review. The task(s) may include the acceptance of the case. The reviewer may be a member of the threat analysis group(s). The user(s) may include the reviewer.

The UI may include a feature to allow the reviewer(s) to block other reviewer(s) from accepting the case. The tool may "lock" the case on the review. The tool may block other review(s). The tool may be configured to keep track of which reviewer accepted the case. The tool may be configured to present, as via the UI, which reviewer accepted the case.

The UI may present the user(s) with a view of the queue. The queue may include content of several emails. The queue may include page(s) of content. The several emails may include the email. The UI may be configured to facilitate the user(s) selecting the email from the queue.

The view of the queue may be presented by the UI in a first viewing area of the UI. The first viewing area may include a first viewing window. The first viewing area may include one or more of the feature(s).

The UI may present the user(s) with a second viewing area. The second viewing area may include a second viewing window. The second viewing area may include a preview of the email and/or of the email data. The preview may include the component(s) data. The second viewing area may provide more detailed data regarding the email than that provided by the first viewing area. The second viewing area may include one or more of the feature(s).

Viewing more in-depth detail(s) of the case may involve viewing a third viewing area presented by the UI. The third viewing area may include a third viewing window. The tool may be configured to present the third viewing area in response to activation of one or more of the feature(s) of the first and/or second viewing areas. The third viewing area may present a view of the more in-depth details. The third viewing area may include one or more of the feature(s).

Any of the first, second or third viewing area may include one or more than one section. The section(s) may include a header. The header may display one or more of the data. The header may include an identifier of the campaign. The header may include one or more of the feature(s).

The apparatus may involve, and the methods may include, a process for preventing a malicious email attack upon an enterprise. The process may include a transmission of data associated with the email to external services. The process may include a receipt of data associated with the email from external services. The process may include looking up one or more of the modules in a directory of the modules. The directory may be internal to the enterprise. The directory may be external to the enterprise. The process may include applying the module(s) to the data to evaluate the cybersecurity threat level(s) posed by the email and/or its component(s). The module(s) may analyze the component(s). The tool may be configured to perform the process.

The apparatus may include, and the methods may involve, a system for calibrating cybersecurity triaging of email(s). The calibrating may include calibrating cybersecurity software. The calibrating may include providing feedback to an enterprise associate. The calibrating may include providing feedback to an enterprise reviewer involved in the calibrating.

The system may include a dummy email. The dummy email may be configured to represent the suspicious email. The dummy email may be configured to present as malicious. The dummy email may be configured to represent a malicious email. The dummy email may be configured to mimic the malicious email. The dummy email may be configured to involve the threat type. The dummy email may be configured to include malware. The dummy email may be configured to include a representation of the malware. The dummy email may be configured to present as benign. The dummy email may be configured to represent a benign email. The dummy email may be configured to mimic the benign email. The system may include a safety mechanism to prevent actual harm from being caused by the dummy email.

The dummy email may include formatting designed to elicit one or more than one preferred response during treatment of the dummy email by the triaging. The calibrating may include using the dummy email to elicit an actual response to the dummy email. The calibrating may include testing a response of the tool. The calibrating may include testing a response of the filter. The calibrating may include testing a response of the submitter. The calibrating may include testing a response of the receiver. The calibrating may include testing a response of the deconstructor. The calibrating may include testing a response of one or more of the module(s). The calibrating may include testing a response of the UI. The calibrating may include testing a response of the reviewer(s). The calibrating may include testing a response of the enterprise threat analysis group(s).

The calibrating may include monitoring treatment of the dummy email. The treatment may include the actual response. The monitoring may include determining if the dummy email is treated as safe. The monitoring may include determining if the dummy email is treated as malicious.

The treatment of the dummy email may be performed by the filter. The treatment by the filter may include blocking receipt by the associate of the dummy email. The treatment by the filter may include blocking access by the associate to the dummy email. The treatment by the filter may include blocking access by the associate to one or more than one component of the dummy email. The treatment by the filter may include allowing receipt by the associate of the dummy email. The treatment by the filter may include allowing access by the associate to the dummy email. The treatment by the filter may include allowing access by the associate to the component(s) of the dummy email.

The treatment of the dummy email may be performed by the associate. The treatment by the associate may include submission of the dummy email. The treatment by the associate may include opening the dummy email. The treatment by the associate may include clicking a link included in the dummy email.

The treatment of the dummy email may be performed by the tool. The treatment by the tool may include deconstructing the dummy email. The treatment by the tool may be performed by the module(s). The treatment by the tool may include the scoring of the component(s). The treatment by the tool may include assigning of threat value(s) to the dummy email. The treatment by the tool may include the action(s). The treatment by the tool may include the storing.

The treatment of the dummy email may be performed by the reviewer(s). The treatment of the dummy email may be performed by the enterprise threat analysis group(s). The treatment by the tool or by the reviewer(s) may include the escalating.

The calibrating may include providing feedback to enterprise manager(s) of the tool. The calibrating may include providing feedback to the tool. The calibrating may involve the machine learning. The calibrating may include providing feedback to the submitter. The calibrating may include providing feedback to the reviewer. The calibrating may include providing feedback to the enterprise threat analysis group(s).

The feedback may include a communication including information regarding a performance in the treatment of the dummy email. The feedback may include data regarding the treatment of the dummy email. The feedback may include data regarding a preferred treatment of the dummy email. The preferred treatment may include the preferred response. The preferred treatment may include treatment of the dummy email on the basis of the formatting of the dummy email. The feedback may include a representation of a difference between the treatment and the preferred treatment. The feedback may include actual instructions for future treatments of future emails.

The calibrating may include adjusting settings of the tool based on the feedback. The calibrating may include adjusting settings of the filter. The calibrating may include adjusting rules governing selection of the module(s). The calibrating may include adjusting settings of the module(s). The calibrating may include adjusting the scoring. The calibrating may include adjusting setting(s) and/or feature(s) of the UI. The calibrating may include adjusting setting(s) of the queue. The calibrating may include adjusting setting(s) of the transmitter(s). The calibrating may include adjusting setting(s) of the selection of the action(s).

The tool may include RAM, ROM, an input/output ("I/O") module and a non-transitory or non-volatile memory. The I/O module may include a keyboard, a microphone, a button and/or a touch screen or any other modality of accepting input provided by a user. The I/O module may include one or more of a speaker for providing audio output, a display for providing textual, audiovisual and/or graphical output, or any other modality of providing output to the user.

The computer executable instructions such as software applications may be stored within the non-transitory memory and/or other storage media. The software may provide instructions to the processor that instruct the tool to perform various functions. For example, the memory may store software used by the tool, such as an operating system, application programs, web browser and a database. Alternatively, some or all of computer executable instructions of the tool may be embodied in hardware or firmware components of the tool.

Software application programs, which may be used by the tool, may include computer executable instructions for invoking user functionality related to communication, such as email, short message service ("SMS"), and voice input and speech recognition applications.

The tool may operate in a networked environment. The tool may support establishing network connections to one or more remote computers. Such remote computers may be nodes on a network. The nodes may be personal computers or servers that include many or all of the elements described above relative to the tool. The network connections may include a local area network ("LAN") and a wide area network ("WAN"), and may also include other networks.

When used in a LAN networking environment, the tool may be connected to the LAN through a network interface or adapter. The communication circuit may include the network interface or adapter.

When used in a WAN networking environment, the tool may include a modem or other means for establishing communications over a WAN, such as the Internet. The communication circuit may include the modem.

It will be appreciated that the existence of any of various well-known protocols such as TCP/IP, Ethernet, FTP, HTTP and the like is presumed, and the tool can be operated in a client-server configuration to permit the user to retrieve web pages from a web-based server. Web browsers can be used to display and manipulate data on web pages.

The tool and network nodes may include various other components, such as a battery, a speaker and antennas. For example, network nodes may be portable devices such as a laptop, a tablet, a smartphone or any other suitable device for receiving, storing, transmitting and/or displaying relevant information.

The tool may be operational with numerous other general purpose or special purpose computing system environments or configurations. Examples of well-known computing systems, environments and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The tool may utilize computer-executable instructions, such as program modules, executed by a computer. Generally, program modules include routines, programs, objects, components, data structures, etc. that perform particular tasks or implement particular abstract data types. The tool may be operational with distributed computing environments where tasks are performed by remote processing devices that are linked through a communications network. In a distributed computing environment, program modules may be located in both local and remote computer storage media including memory storage devices. The tool may involve an automated process flow.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

One of ordinary skill in the art will appreciate that the elements shown and described herein may be performed in other than the recited order and that one or more elements illustrated may be optional. The methods of the above-referenced embodiments may involve the use of any suitable elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative steps of process 100 for preventing infiltration of an enterprise by malicious email(s). Process 100 may begin at step 101.

At step 101, the email may be submitted for review. Submission 101 may be of a reference to the email. Submission 101 may be of the incident. Submission 101 may be to the receiver. Submission 101 may be to the queue.

At step 103, the email may be extracted from the mailbox. The email may be extracted from the queue. The tool may extract the email. Data associated with the email may be extracted for analysis.

At step 105, the email may be deconstructed by the tool into one or more scannable items. The item(s) may include the component(s).

At step 107, the item(s) may be subjected to a scoring for threat level. The scoring may be performed by the modular scanner(s). Each item may receive one or more than one item score from the scanner(s).

At step 109, the tool may assign a highest or most severe item score to the item. For example, an item receiving an item score of 3 and 5 by two different modular scanners may be assigned the more severe item score of 5. Other item scoring algorithms are also envisioned within the scope of the invention. Other item scoring algorithms may include an average of the item scores. Other item scoring algorithms may include a weighted average of the item scores.

At step 111, a most severe of all of the item score(s) for all of the scored item(s) may be assigned as a value to the email. For example, an email including a first item assigned a severe item score of 5 and a second item assigned a severe item score of 7, may be assigned an email value of 7. Other email scoring algorithms are also envisioned within the scope of the invention. Other email scoring algorithms may include an average of the severe item scores. Other item scoring algorithms may include a weighted average of the severe item scores.

At step 113, the tool may select and/or perform an action based on the assigned email value, such as escalating the incident.

Figure 2:
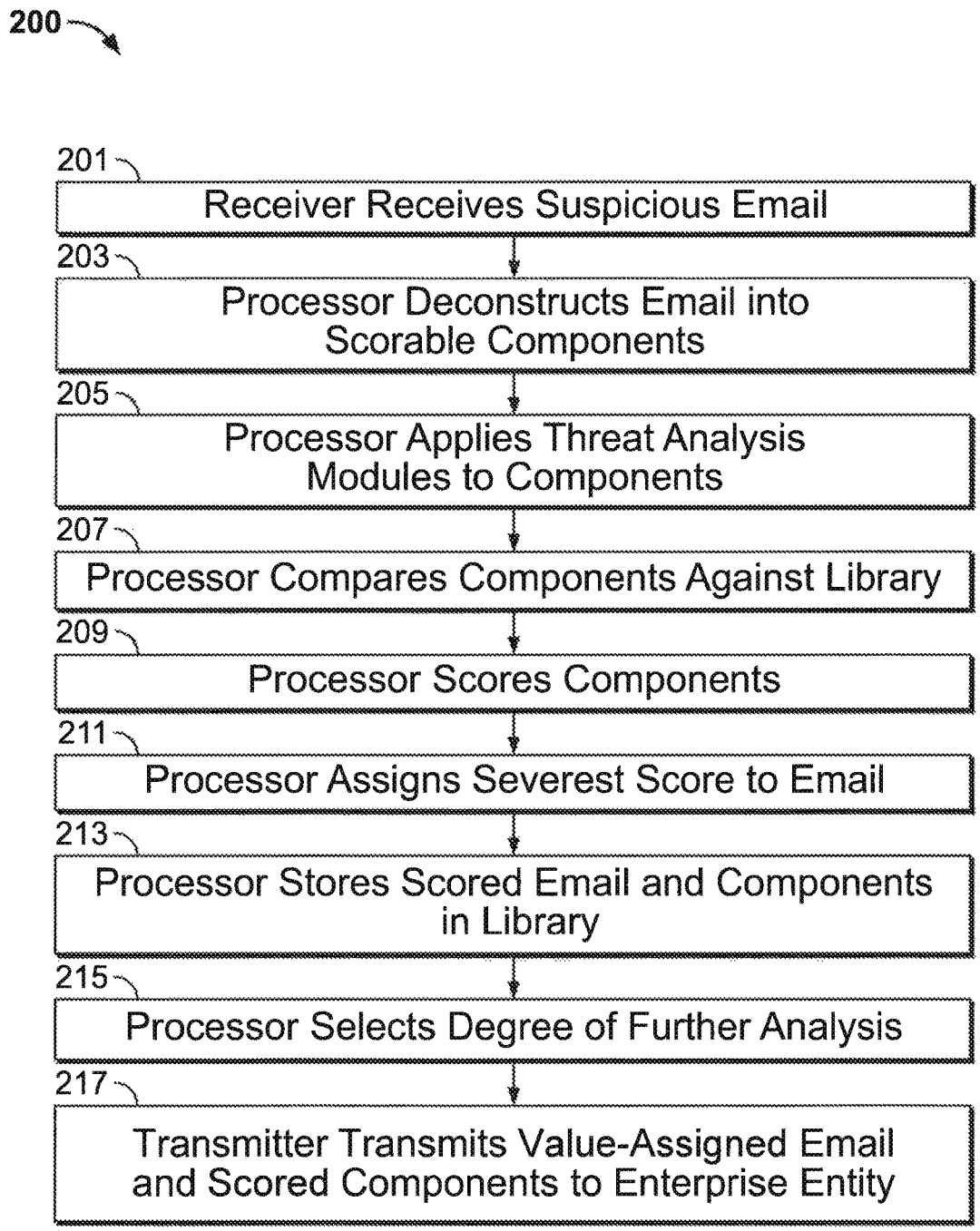
FIG. 2 is a flow diagram of an illustrative process in accordance with the principles of the invention.

FIG. 2 shows illustrative steps of process 200 for preventing infiltration of an enterprise by malicious emails. Process 200 may begin at step 201.

At step 201, the receiver may receive the suspicious email from the submitter.

At step 203, the processor may deconstruct the email into the scorable components, such as URLs, text and/or attachments.

At step 205, the processor may apply one or more threat analysis modules to the components. The module(s) may be configured to detect malicious emails and/or software. The module(s) may be internal and/or proprietary to the enterprise. The module(s) may be external and/or nonproprietary to the enterprise, such as third-party programs and/or services.

At step 207, the processor may perform a comparison of the components against previously analyzed email components stored in the enterprise library of past email deconstructions. The comparison may be performed by one or more of the module(s).

At step 209, the components may each be assigned a most severe of threat level component scores provided by the module(s) at step 205 and/or by the library comparison at step 207.

At step 211, the processor may assign a most severe of the overall component scores to the email as the email value.

At step 213, the processor may store the email and/or the components. The processor may store the email and/or the components in the library. The processor may store the email and/or the components in association with the corresponding email value(s) and/or the corresponding component score(s).

At step 215, the processor may select a degree of further analysis based on the email value(s) and/or the component score(s).

At step 217, on the basis of the degree selected at step 215, the transmitter may transmit the email, email value(s), component(s) and/or component score(s) to a degree-appropriate enterprise entity for further review and/or response.

FIG. 3 shows an illustrative view of user interface (UI) 300. UI 300 may present a view of the queue of potentially malicious emails submitted for review. The emails may be presented in a queue table such as Table 301. Data associated with each email may be presented in a distinct row of Table 301. The data may be organized by data type in columns of Table 301. The data may include email component data. Component data may include a subject of the email, here shown in subject column 305. Identification of the submitter may be included in abuse reporter column 307. An originating address of the email may be included in original sender column 309. Other data associated with the email may be included in columns 311. For example, identification of a reviewer who accepted a case associated with the email may be indicated in "locked by" column 313. Other data may include current status of review of an email, recurrence, prior ratings and stage of analysis.

An email in the queue, such as email 303 shown highlighted in the queue of Table 301, may be selected by the reviewer for previewing in previewing window 315. Previewing window 315 may include one or more than one tab indicating data selectable for viewing by the reviewer. Clicking on the tab may present the user(s) with data associated with the tab. The tab(s) may include overview tab 317. Clicking overview tab 317 may present basic data 319 associated with the email. Basic data 319 may include information shown in Table 301. The tab(s) may include other user-selectable tabs for viewing data of other components of the email, such as email body tab 321, URLs tab 323 and attachments ("Files") tab 325.

UI 300 may include features, such as virtual buttons, by which the reviewer may initiate actions. Based on data in table 301 and/or previewing window 315, the reviewer may choose a further action such as escalating the case to a different reviewer or team via escalate button 327. The reviewer may decide to review the case in more detail via review button 329.

Figure 4:
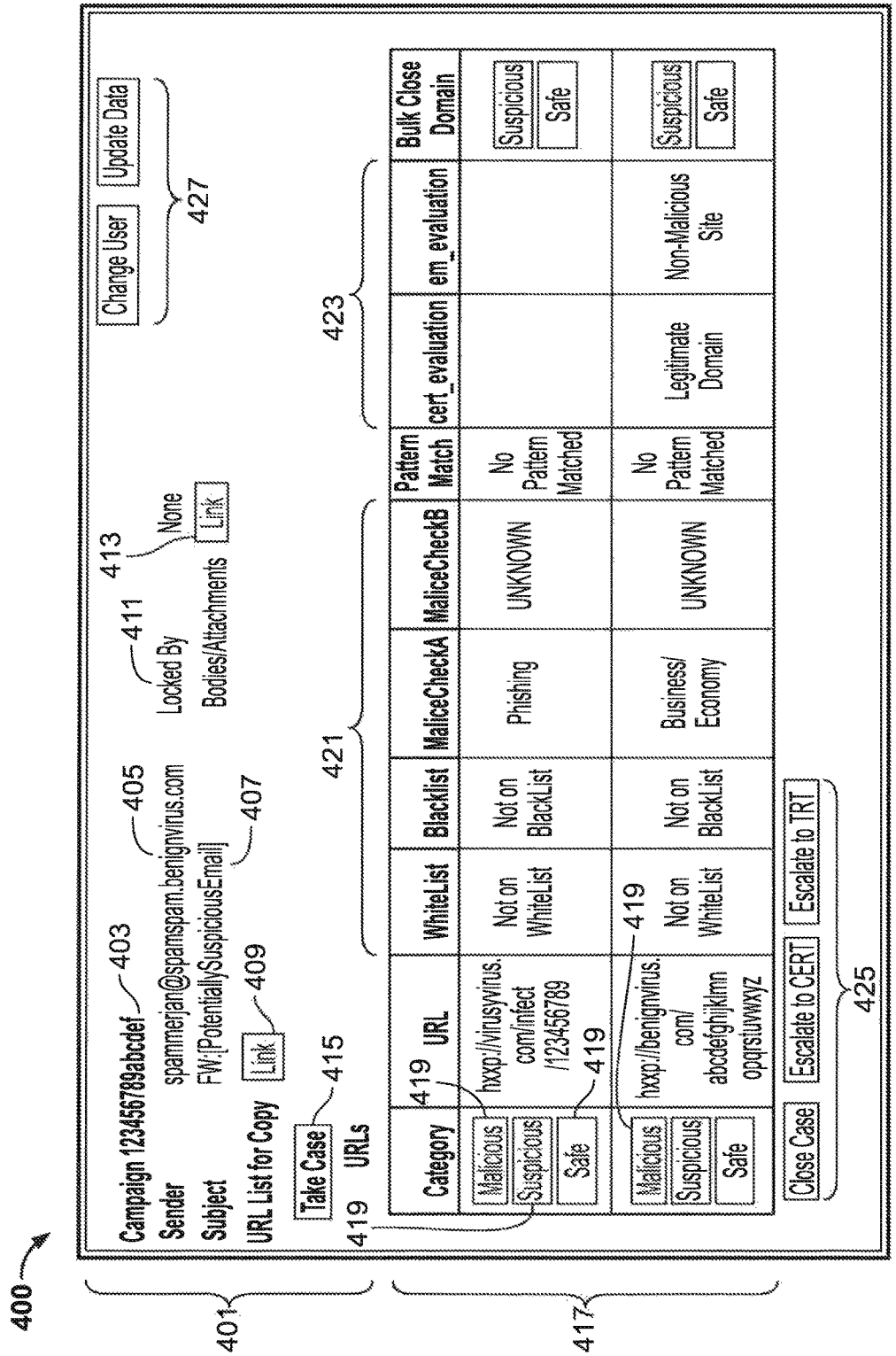
FIG. 4 shows an illustrative screen display in accordance with the principles of the invention.

FIG. 4 shows an illustrative view of user interface (UI) 400 including a view of an email selected for viewing. The view may be presented in response to the reviewer selecting to review a case in more detail via review button 329 (shown in FIG. 3).

UI 400 may include header section 401. Header section 401 may include an email campaign identifier, for reference purposes, such as identifier 403. Header section 401 may include basic email data, such as originating sender data 405, email subject data 407, link 409 for presenting URLs in a format safe for copying, and link 413 for safely downloading a body of the email and/or attachments of the email. Header section 401 may include indicator 411 indicating whether the case has been locked for review by a reviewer. Such locking may facilitate team workflow. Header section 401 may include feature 415 via which the reviewer may select the case for review and/or lock the case to prevent duplicate work. Header section 401 may include additional features, such as features 427 for changing a user logged into the UI or updating data associated with the case.

UI 400 may include items table 417. Table 417 may include rows of items derived by deconstruction of the email. The items may include the component(s) of the email. Table 417 may include categorization buttons 419 via which the reviewer may categorize the items as malicious, suspicious or safe. Buttons 419 may be in a disabled state until the user takes the case by activating feature 415. The disabled state of buttons 419 may be indicated visually, e.g., by being illustrated as faded. Status and analysis result information may be presented in columns 421 showing also results from different modules. Present and/or previous evaluation information by enterprise teams analyzing the campaign may be presented in columns 423.

UI 400 may include actions section 425. Actions section 425 may include one or more features such as virtual button(s). The feature(s) may facilitate the reviewer taking specified actions after reviewing scanned items, their tool-supplied values and/or their scores. The feature(s) may facilitate the reviewer closing the case. Closing the case may save all resulting analysis. The analysis may be associated with the email and/or its components. The analysis may be saved in the library. The feature(s) may facilitate the reviewer escalating the case to another team if different or further action is deemed prudent.

Figure 5:
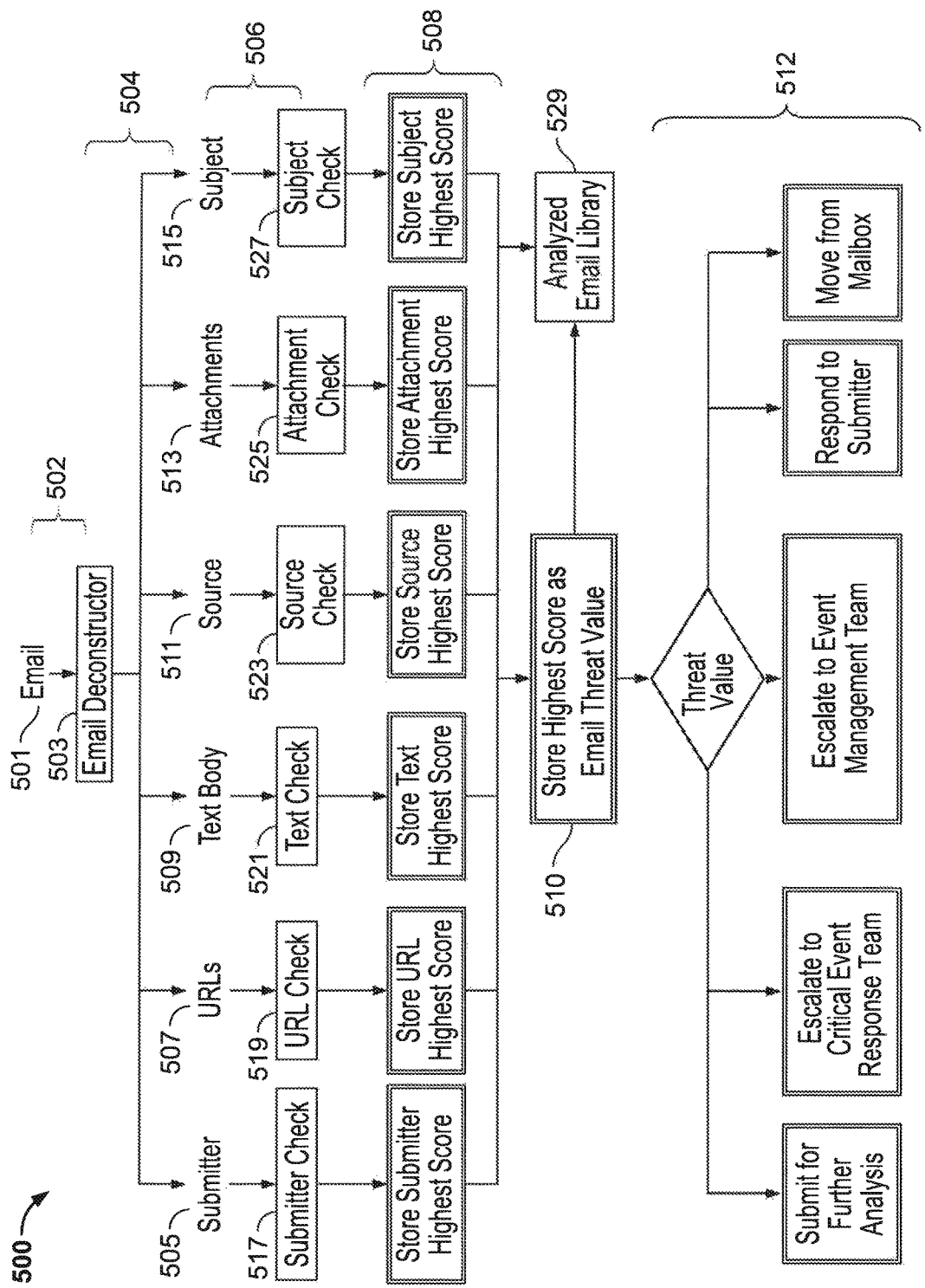
FIG. 5 is a flow diagram of an illustrative process in accordance with the principles of the invention.

FIG. 5 is a flow chart showing process 500 for preventing infiltration of an enterprise by malicious emails. Process 500 may begin at step 502.

At step 502, email 501 may be submitted by a user to email deconstructor 503.

At step 504, email deconstructor 503 may parse email 501 into one or more components, such as submitter identifier 505, URLs 507, email body text 509, originating source identifier 511, attachments 513, and/or email subject text 515.

At step 506, each of the components may be submitted for analysis to one or more appropriate sets of component check(s), such as submitter check(s) 517, URL check(s) 519, text check(s) 521, source check(s) 523, attachment check(s) 525 and/or subject check(s) 527. Each component check of each set of component check(s) may produce a component score for the corresponding component.

At step 508, a highest or most severe of the component scores for each set may be stored in association with the corresponding component in library 529. The most severe of all the scores of all the components may be assigned as the threat value of email 501.

At step 510, the assigned email value may be stored in library 529.

At step 512, depending on the email value, further action may be taken, such as submitting for further analysis, escalating to a critical event response team, escalating to an event management team, responding to the submitter and/or moving from the mailbox. Further actions may include removing the email from the queue (not shown).

Figure 6:
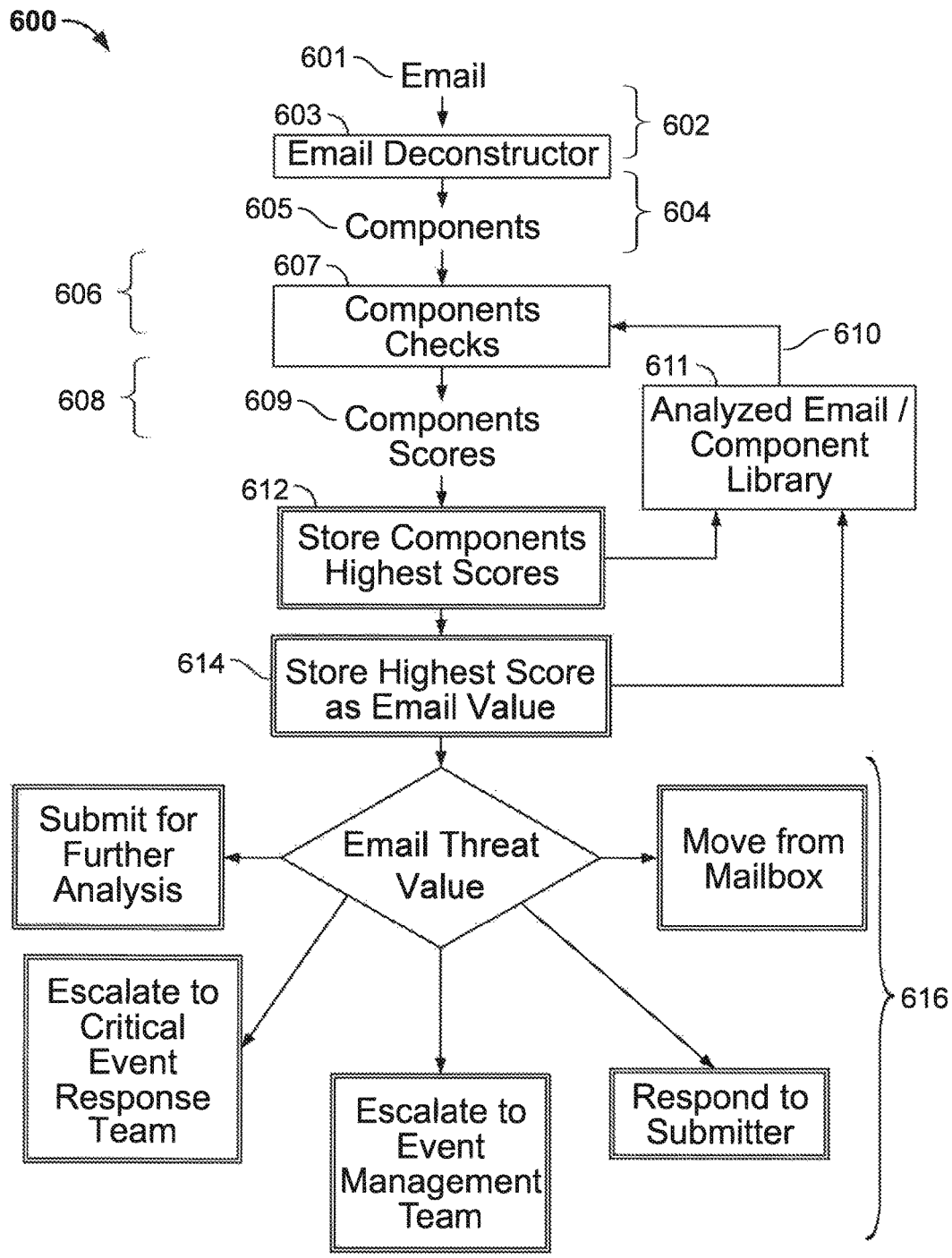
FIG. 6 is a flow diagram of an illustrative process in accordance with the principles of the invention.

FIG. 6 is a flow chart showing process 600 for preventing infiltration of an enterprise by malicious emails. Process 600 may begin at step 602.

At step 602, email 601 may be submitted by a recipient to email deconstructor 603.

At step 604, email deconstructor 603 may parse email 601 into component(s) 605.

At step 606, component(s) 605 may be submitted for analysis to component check(s) 607.

At step 608, component check(s) 607 may produce component score(s) 609 associated with corresponding component(s) of component(s) 605.

At step 610, component check(s) 607 may include use of past email deconstruction data stored in library 611.

At step 612, a highest or most severe of component score(s) 609 for each of component(s) 605 may be stored in association with the corresponding component(s) of component(s) 605 in library 611 for use in future analyses.

At step 614, a most severe of all scores 609 of all component(s) 605 may be assigned to email 601 as its threat value. The assigned email value may be stored in library 611 for use in future analyses.

At step 616, depending on the email value, further action may be taken, such as submitting for further analysis, escalating to a critical event response team, escalating to an event management team, responding to the submitter and/or moving from the mailbox. Further actions may include removing the email from the queue (not shown).

Figure 7:
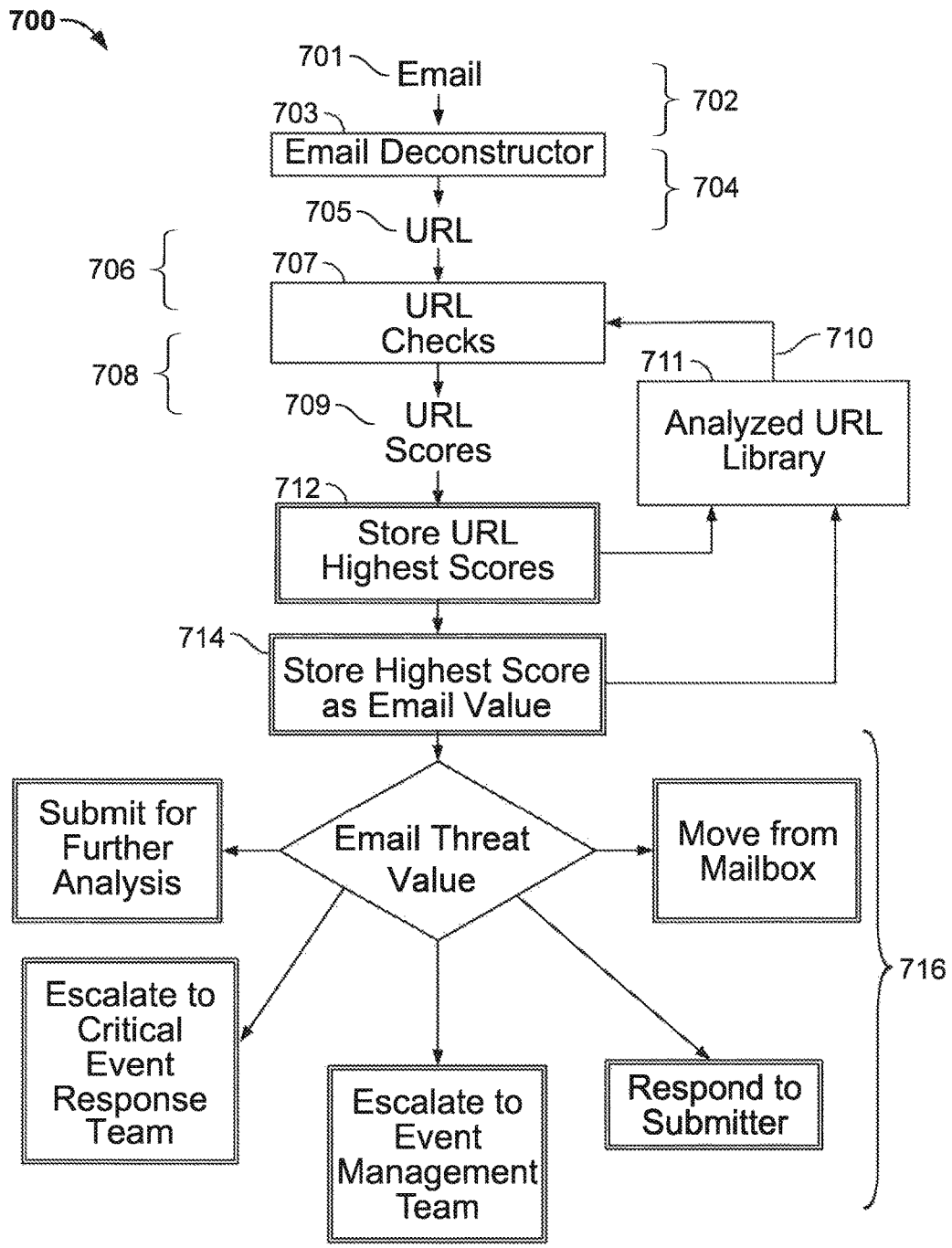
FIG. 7 is a flow diagram of an illustrative process in accordance with the principles of the invention.

FIG. 7 is a flow chart showing process 700 for preventing infiltration of an enterprise by malicious emails. Process 700 may begin at step 702.

At step 702, email 701 may be submitted by a recipient to email deconstructor 703.

At step 704, email deconstructor 703 may extract URL(s) 705 from email 701.

At step 706, URL(s) 705 may be submitted for analysis to URL check(s) 707.

At step 708, URL check(s) 707 may produce URL score(s) 709 associated with corresponding URL(s) of URL(s) 705.

At step 710, URL check(s) 707 may include use of past email URL data stored in analyzed URL library 711.

At step 712, a highest or most severe of URL score(s) 709 for each of URL(s) 705 may be stored in association with the corresponding URL(s) of URL(s) 705 in library 711 for use in future analyses.

At step 714, a most severe of all scores 709 of all URL(s) 705 may be assigned to email 701 as its threat value. The assigned email score may be stored in library 711 for use in future analyses.

At step 716, depending on the email value, further action may be taken, such as submitting for further analysis, escalating to a critical event response team, escalating to an event management team, responding to the submitter and/or moving from the mailbox. Further actions may include removing the email from the queue (not shown).

Thus, apparatus and methods are provided for preventing infiltration of an enterprise by malicious emails; for efficiently determining which emails submitted for review pose a threat; and for instructing enterprise associates regarding detecting and responding to potentially malicious emails. Persons skilled in the art will appreciate that the present invention can be practiced by other than the described embodiments, which are presented for purposes of illustration rather than of limitation, and that the present invention is limited only by the claims that follow.

What is claimed is:

1. An enterprise level software tool for cybersecurity triaging of a suspicious email sent to an associate of an enterprise, the enterprise including a hierarchy of cybersecurity threat analysis entities, the tool comprising:
    a receiver configured to receive the suspicious email submitted by the associate, the email to be analyzed for a level of cybersecurity threat, the level selected from a plurality of cybersecurity threat levels;
    a non-transitory machine readable memory storing computer executable instructions;
    a processor configured to execute the computer executable instructions, the computer executable instructions, when executed by the processor, for:
        deconstructing the email into a plurality of components each scoreable for the cybersecurity threat level, the components including at least one uniform resource locator (URL) associated with the email;
        for each component of the deconstructed email components:
            analyzing the component for the cybersecurity threat level by application of a plurality of security threat analysis modules to the component, the modules each configured for threat evaluation of the component, the analyzing including comparison of the component against items in a library of previously scored email deconstructions, the threat evaluation including generating of a threat score for the component; and
            scoring the component with a component score for a severity of the threat level, the component score based on the highest of the threat scores generated by the security threat analysis modules for the component;
        assigning to the email the most severe of the component scores;
        storing, in the library:
            the email in association with the assigned score of the email; and
            each of the components in association with the component score of the each of the components; and
        on the basis of the severe score assigned to the email, selecting a degree of further enterprise analysis of the email, the selecting including transmission:
            based on an email score of a lesser severity, to a first of the cybersecurity entities, a first entity for dealing with lesser cybersecurity threats; and
            based on an email score of a greater severity, to a second of the cybersecurity entities, a second entity for dealing with greater cybersecurity threats; and
    a transmitter configured for executing the transmission, the transmission including:
        the email in association the email's assigned score; and
        the one or more components in association with each component's score;
wherein, on the basis of the degree of further enterprise analysis selected, and, when the comparison shows the URL as previously stored in the library, the selecting including transmitting to at least one of the entities determined to have analyzed a previous email associated with the URL,
    wherein the comparison includes a checking of stored scores assigned to previous emails originating from the same URL; and
    wherein the stored scores include, when available, final scoring of cybersecurity threat level produced by analysis by at least one enterprise threat analysis group of the previous emails originating from the same URL.

2. The enterprise level software tool of claim 1 wherein the cybersecurity threat includes at least one threat type selected from the group consisting of denial-of-service attack, malware, ransomware, virus, trojan and worm.

3. The enterprise level software tool of claim 2 wherein the receiver is further configured to receive from the enterprise associate an identification of the threat type of the submitted email.

4. The enterprise level software tool of claim 3 wherein the identification is used to drive an initial iteration of threat analysis of the submitted email.

5. The enterprise level software tool of claim 1 wherein the scoreable email components include, in addition to the at least one URL, at least one of the components selected from the group consisting of email text body, email text subject, email attachment, sender identifier, enterprise associate identifier, hyperlink and other URLs.

6. The enterprise level software tool of claim 5 wherein, when the components include a sender identifier indicating an enterprise client as sender, enterprise information regarding the client is associated with the email.

7. The enterprise level software tool of claim 1 wherein a number of the modules are adjustable by the tool.

8. The enterprise level software tool of claim 1 wherein a type of the modules is adjustable by the tool.

9. The enterprise level software tool of claim 1 wherein a depth of analysis of the modules are adjustable by the tool.

10. The enterprise level software tool of claim 1 wherein the cybersecurity threat analysis entities include the enterprise associate.

11. The enterprise level software tool of claim 1 wherein the cybersecurity threat analysis entities include an enterprise-internal threat analysis group.

12. The enterprise level software tool of claim 1 wherein the cybersecurity threat analysis entities include a quarantined environment for safely opening the submitted email.

13. The enterprise level software tool of claim 12 wherein the quarantined environment provides for safely opening one or more attachments associated with the submitted email.

14. The enterprise level software tool of claim 12 wherein the quarantined environment provides for safely following one or more hyperlinks associated with the submitted email.

15. An enterprise level software tool for cybersecurity triaging of a suspicious email sent to an enterprise, the enterprise including a hierarchy of cybersecurity threat analysis entities, the tool comprising:
  a receiver configured to receive the suspicious email submitted by an enterprise associate, the email to be analyzed for a cybersecurity threat level selected from a plurality of cybersecurity threat levels;
  a non-transitory machine readable memory storing computer executable instructions;
  a processor configured to execute the computer executable instructions, the computer executable instructions, when executed by the processor, for:
    deconstructing the email into components, each of the components scoreable for the cybersecurity threat level, the components including at least one uniform resource locator (URL) associated with the email;
    analyzing each one of the components for the cybersecurity threat level by application of security threat analysis modules to the component, the modules each configured for:
      threat evaluation of the component, including comparison against items in a library of previously scored email deconstructions; and
      generation, based on the threat evaluation, of a threat score to the component, the threat score selected from a plurality of threat scores;
    scoring, with a component score, each of the components for severity of threat level, the component score based on a highest of the threat scores generated by the threat analysis modules, for the component;
    assigning to the email a most severe of the component scores;
    storing, in the library:
      the email in association with the assigned score of the email; and
      each of the components in association with the score of the each of the components; and
    on the basis of the assigned score of the email, selecting a degree of further enterprise analysis of the email, the selecting including transmission:
      based on an email score of a lesser severity, to a first of the cybersecurity entities, a first entity for dealing with lesser cybersecurity threats; and
      based on an email score of a greater severity, to a second of the cybersecurity entities, a second entity for dealing with greater cybersecurity threats; and
  a transmitter configured for the transmission, to at least one appropriate entity within the enterprise, of:
    the email in association with the assigned score; and
    the components in association with each component's associated score;
  wherein, on the basis of the degree of further enterprise analysis selected, a notification is sent to the enterprise associate;
  wherein the scoreable email components include, in addition to the at least one URL, at least one of the components selected from the group consisting of email text body, email text subject, email attachment, sender identifier, enterprise associate identifier, hyperlink and other URLs.

16. An enterprise level software tool for triaging a suspicious email, the tool comprising:
  a receiver configured to receive the suspicious email submitted by an enterprise associate, the email to be analyzed for a cybersecurity threat level;
  a non-transitory machine readable memory storing computer executable instructions;
  a processor configured to execute the computer executable instructions, the instructions, when executed by the processor, for:
    deconstructing the email into components each scoreable for the cybersecurity threat level, the components including at least one uniform resource locator (URL) associated with the email;
    for each one of the deconstructed email components:
      analyzing the component for the cybersecurity threat level by application of a plurality of security threat analysis modules to the component, each of the modules configured for generation of a component score for the component based on a determined severity of threat level, the analyzing including comparison of the component against items in a library of previously scored email deconstructions; and
      assigning to the component the highest of the scores generated by the modules for the component;
    assigning to the email the most severe of the assigned component scores;
    storing, in the library:
      the email in association with the assigned score of the email; and
      each of the components in association with the component score of the each of the components; and
    on the basis of the score assigned to the email, selecting a degree of further enterprise analysis of the email, the selecting including transmission:
      based on an email score of a first level of severity, to a first of a plurality of enterprise threat analysis groups, a first analysis group for dealing with lesser cybersecurity threats; and
      based on an email score of a second level of severity greater than the first level of severity, to a second of the threat analysis groups, a second group for dealing with greater cybersecurity threats; and
  a transmitter configured for the transmission;
  wherein:
    the selecting includes, upon a determination that at least one of the threat analysis groups had analyzed a previous email associated with the URL, transmitting the transmission to the one of the groups that analyzed the previous email;
the transmission including:
the email in association with the assigned score;
each of the one or more components in association with the component score of the each of the components; and
a measure of the degree of further enterprise analysis selected;
wherein the scoreable email components include, in addition to the at least one URL, at least one of the components selected from the group consisting of email text body, email text subject, email attachment, sender identifier, enterprise associate identifier, hyperlink and other URLs.

17. An enterprise level software tool for triaging a suspicious email, the tool comprising:
a receiver configured to receive the suspicious email submitted by an enterprise associate, the email to be analyzed for a cybersecurity threat level;
a non-transitory machine readable memory storing computer executable instructions;
a processor configured to execute the computer executable instructions, the instructions, when executed by the processor, for:
deconstructing the email into a plurality of email components including at least one extracted uniform resource locator (URL) associated with the email, the URL scoreable for the cybersecurity threat level;
analyzing the components including the at least one URL for the cybersecurity threat level by application of security threat analysis modules to the components, each of the modules configured for generation of a threat score for the components based on a determined severity of threat level, the analyzing including comparison against URLs in a library of previously scored email deconstructions;
scoring, with a URL score, the at least one URL for severity of threat level based on the highest threat score generated by the modules for the URL;
upon determination that the URL score is the highest of the component threat scores, assigning to the email an email score at least partly based upon the URL score;
storing, in the library:
the email in association with the assigned email score; and
the at least one URL in association with the URL score of the at least one URL; and
on the basis of the assigned email score, selecting a degree of further enterprise analysis of the email, the selecting including transmission:
based on an email score of a first level of severity, to a first of a plurality of enterprise threat analysis groups, a first analysis group for dealing with lesser cybersecurity threats; and
based on an email score of a second level of severity greater than the first level of severity, to a second of the threat analysis groups, the second group for dealing with greater cybersecurity threats; and
a transmitter configured for the transmission,
wherein the transmission includes:
upon a determination that at least one of the enterprise threat analysis groups had analyzed a previous email associated with the URL, transmitting to the at least one threat analysis group; and
the email in association with the assigned email score;
the at least one URL in association with the URL score; and
a measure of the degree of further enterprise analysis selected;
wherein the comparison includes a checking of stored scores assigned to previous emails originating from the same URL; and
wherein the stored scores include, when available, final scoring of cybersecurity threat level produced by analysis by at least one enterprise threat analysis group of the previous emails originating from the same URL.

18. The enterprise level software tool of claim 17 wherein the assigned email score is based also upon at least one component of the email in addition to the at least one URL, the component selected from the group consisting of email text body, email text subject, email attachment, sender identifier, enterprise associate identifier, hyperlink and other URLs.

* * * * *